UNITED STATES PATENT OFFICE.

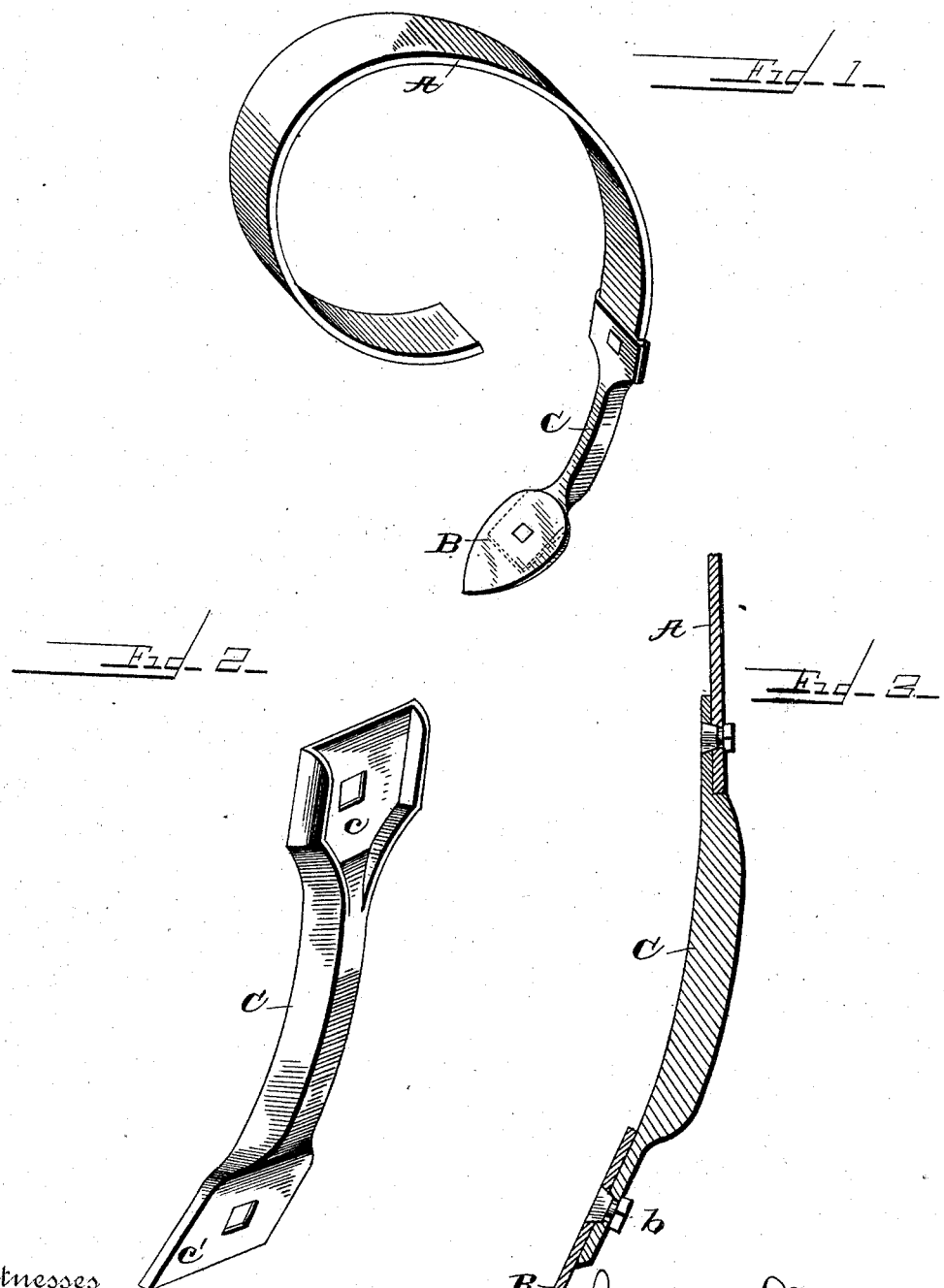

HORATIO GALE, OF ALBION, MICHIGAN, ASSIGNOR TO THE GALE MANUFACTURING COMPANY, OF SAME PLACE.

SPRING-TOOTH FOR HARROWS.

SPECIFICATION forming part of Letters Patent No. 502,488, dated August 1, 1893.

Application filed May 13, 1891. Serial No. 392,603. (No model.)

*To all whom it may concern:*

Be it known that I, HORATIO GALE, a citizen of the United States, residing at Albion, in the county of Calhoun and State of Michigan, have invented certain new and useful Improvements in Spring-Teeth for Harrows; and I do hereby declare the following to be a full, clear, and exact description of the invention, such as will enable others skilled in the art to which it appertains to make and use the same.

My invention relates to spring teeth for harrows, and consists in certain improvements in construction whereby desirable results are attained.

In the accompanying drawings I have shown the best mode in which I have contemplated embodying my invention; and said invention is disclosed in the following description and claims.

Figure 1 is a perspective view of a tooth embodying my present invention. Fig. 2 is a view of a portion of the tooth detached; and Fig. 3 is a partial section taken transversely of the tooth.

In using spring harrow-teeth formed with a broad surface to the line of draft at or near the surface of the ground there is liability that the tooth will gather grass, weeds or other débris which will prevent the soil from passing freely away from the tooth at this point resulting in the soil impacting against such broad surface, clogging the harrow and impairing the efficiency of its operation. It has been proposed to avoid these objectionable results by giving a portion of the tooth at the surface of the ground a quarter turn or twist upon its longitudinal axis, so as to present a narrow edge to the line of draft, and to make this portion of the tooth narrow by folding the edges of the tooth backward upon each other. I accomplish the same result in a different manner which has all the advantages of those just described and which enables me to reduce the cost of making such teeth, and in the event of breaking a tooth, the broken part can be more cheaply and readily replaced.

In the drawings, A designates the main elastic portion of the tooth; B, the point; and C, the portion between the point and the main body which presents a narrow surface or edge to the line of draft. The part C is made separate from the point and main body and may be forged, swaged, or formed of malleable cast metal. The upper end is recessed as shown at $c$ to receive the lower end of the elastic portion of the tooth to which it is attached by a bolt or is otherwise secured. The lower end is expanded at $c'$ and is preferably perforated to receive the bolt $b$ by which the point B is secured thereto. The middle portion of the device C is made to present a narrow face to the line of draft and is given such an extent from front to rear as to give the necessary strength to the parts. The point B which is the main earth-engaging portion presents a broad surface to the line of draft, as shown in the drawings. While the removable point effects desirable results in enabling the part of the tooth which is subjected to the greatest wear to be renewed quickly and cheaply, yet the making of the portion of the tooth receiving the greatest amount of wear next to the point removable independently of the point effects results scarcely less important.

What I claim, and desire to secure by Letters Patent, is—

1. An arched flat spring tooth for harrows having a broad surface presented to the line of draft throughout the main portion of its length, and having at its lower extremity a detachable point or main earth engaging portion and a narrower earth engaging portion between said point and the main body of the tooth, said narrower portion being detachable from the main body of the tooth and separable from the point, but rigidly secured to each, substantially as described.

2. An arched spring tooth for harrows having a broad surface presented to the line of draft throughout the main portion of its length and having at its lower end a detachable point and having a narrower portion extending from the main body to the said point, said narrower portion being detachable from the main body and having a recess at its upper end to receive the end of the main body, substantially as described.

In testimony whereof I affix my signature in presence of two witnesses.

HORATIO GALE.

Witnesses:
EDW. G. PECK,
R. E. SCHUMACHER.